May 8, 1923.
J. B. SWAN
ADJUSTABLE CULTIVATOR
Filed March 5, 1921
1,454,225
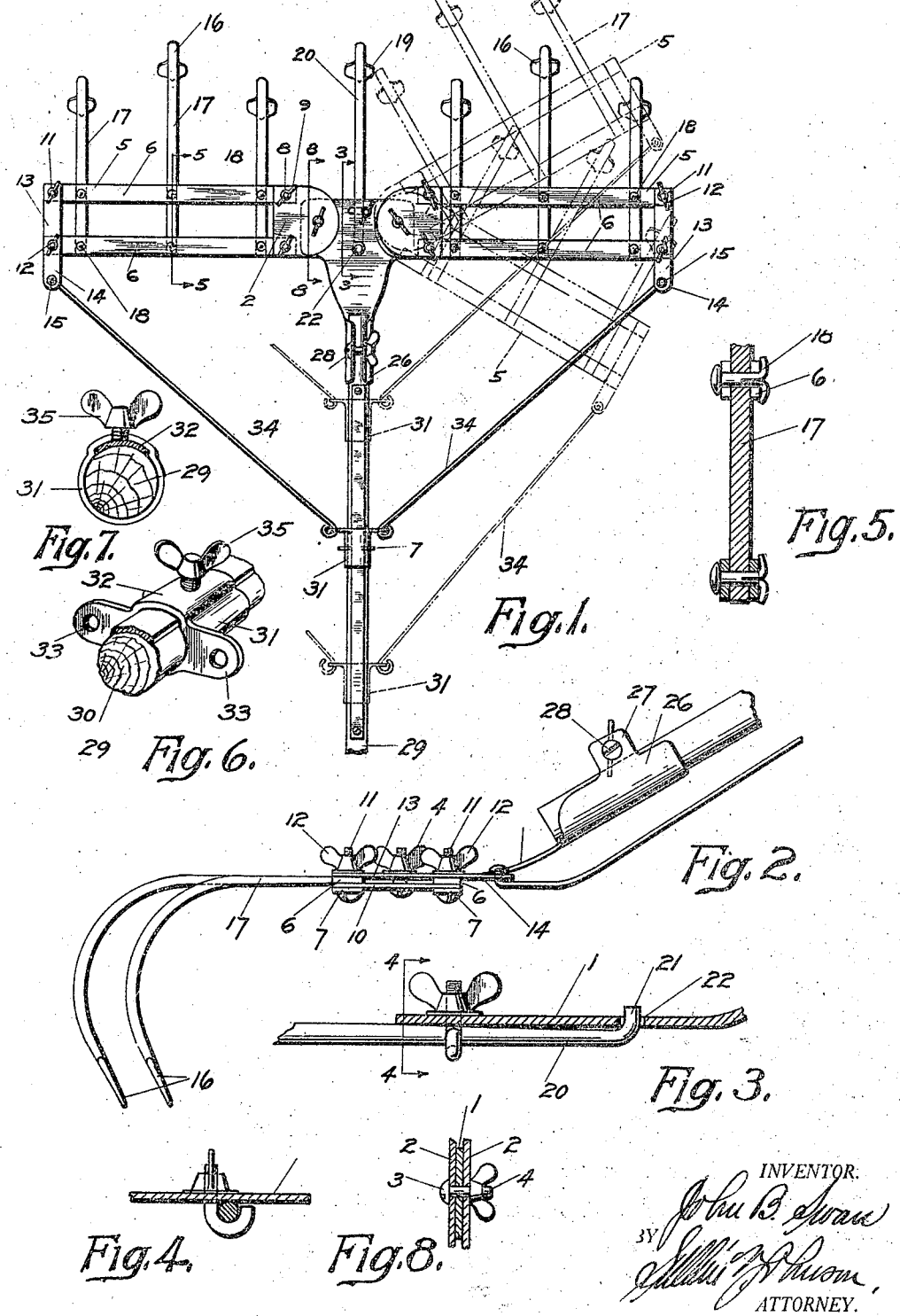

Patented May 8, 1923.

1,454,225

UNITED STATES PATENT OFFICE.

JOHN B. SWAN, OF DENVER, COLORADO, ASSIGNOR OF ONE-HALF TO LOUIS CSEMICZSKY, OF DENVER, COLORADO.

ADJUSTABLE CULTIVATOR.

Application filed March 5, 1921. Serial No. 449,986.

*To all whom it may concern:*

Be it known that I, JOHN B. SWAN, a citizen of the United States, residing at Denver, in the county of Denver and State of Colorado, have invented new and useful Improvements in Adjustable Cultivators, of which the following is a specification.

The present invention is directed to improvements in adjustable cultivators, and more particularly to one of the hand type.

The primary object of the invention is to provide a cultivator constructed in such manner that the teeth carrying frames may be easily and quickly adjusted angularly with respect to the head, whereby the teeth may be positioned to cultivate the plants at different stages of cultivation.

A further object of the invention is to provide a cultivator of this character whereby the teeth carrying frames can be moved to the desired position in a quick and simple manner, and held firmly in the adjusted positions.

A still further object of the invention is to provide a cultivator having means whereby the teeth may be easily and quickly removed from the frames in case it is desired to substitute ones of different forms, or to replace a broken one.

With these and other objects in view, this invention resides in the novel features of construction, formation, combination and arrangement of parts to be hereinafter more fully described, claimed and illustrated in the accompanying drawing, in which:—

Figure 1 is a plan view of the device.

Figure 2 is a side elevation.

Figure 3 is a sectional view on line 3—3 of Fig. 1.

Figure 4 is a sectional view on line 4—4 of Fig. 3.

Figure 5 is a sectional view on the line 5—5 of Fig. 1.

Figure 6 is a perspective view of the sleeve.

Figure 7 is a sectional view on line 7—7 of Fig. 1.

Figure 8 is a sectional view on line 8—8 of Fig. 1.

Referring to the drawing, 1 designates an elongated sheet metal head, which is preferably of the shape illustrated. The sides of the head are engaged between semi-circular plates 2, said plates being pivotally connected to the head through the medium of bolts 3, which are equipped with winged clamping nuts 4.

Located on each side of the head 1 are frames 5, and since these frames are identical in construction, the description of one will suffice for both. Each frame consists of upper and lower front and rear bars 6 and 7, respectively, the inner ends of which are pivotally connected to the plates 2 by bolts 8 equipped with winged clamping nuts 9. The outer ends of the bars 6 and 7 are pivotally connected on opposite faces of a strip 10 by bolts 11 having winged clamping nuts 12 thereon, said bolts also serving to pivotally connect the strip 13, which rests on the upper surface of the bars 6, with the bars 7 and strip 10, the strip 13 having a rearwardly projecting end 14, in which are formed perforations 15, the purpose of which will appear later.

The teeth 16 have their shanks 17 disposed between the bars 6 and 7 of the frames 5, and transversely thereof. In order to pivotally connect the shanks 17 between said bars split pins 18 are passed therethrough, as clearly shown in Fig. 5. These pins can be conveniently removed when it is desired to interchange the teeth and shanks.

In addition to the teeth 16 there is a supplemental tooth 19 having the shank 20 thereof engaged with the under surface of the head 1. The rear end of the shank 20 terminates in an up-standing lug 21 for detachably engaging a perforation 22 formed in said head. A bolt 23 is engaged in the head and has a hook 24 for engaging the shank 20 in advance of the lug. The winged clamping nut 25 carried by the bolt 23 serves to draw the hook 24 in binding engagement with the shank 20, and thus holds said shank tightly clamped against the under surface of the head 1.

The rear end of the head terminates in a split collar 26 having ears 27 carried thereby, and engaged in said ears is a clamping bolt 28 which is operable to contract the collar to cause the same to firmly clamp the handle 29.

A metallic strip 30 is secured in any suitable manner longitudinally of the handle 29. Slidable on the handle is a sleeve 31, the upper portion of which is formed with a housing 32 which is shaped to receive the strip 30 so that the side walls thereof will slidably contact with the sides of the strip and prevents the sleeve from turning on the handle, but at the same time permits the same to slide freely.

The forward end of the sleeve 31 is provided with diametrically arranged ears 33. Links 34 are employed and have their rear ends pivotally engaged with said ears, and their forward ends similarly engaged in the perforations 15 of the ends 14.

A set screw 35 is carried by the housing 32, and is adapted to impinge against the strip 30 to hold the sleeve 31 in adjusted positions on the handle, said strip serving to prevent the screw 35 from marring the wooden handle.

It is obvious that when the sleeve 31 is in the full line position, as shown in Fig. 1, that the frames 5 will be in direct alinement with each other, whereas when the sleeve is moved to either dotted line position said frames will be moved to angularly disposed positions. This is readily accomplished since the shanks 17 are pivotally connected to the bars 6 and 7, and the bars in turn pivotally connected to the head through the medium of the plates 2. It will be of course apparent that as soon as the sleeve is moved on the handle swinging movement will be imparted to the frames through the medium of the links 34, and strips 13, thus swinging them to the desired positions to perform proper cultivation of the soil.

The frames 5 can of course be swung to positions other than those shown in dotted lines in Fig. 1, but for the sake of illustration, the positions shown are sufficient.

Owing to the fact that the bars 6 and 7 are pivotally connected at their inner and outer ends, the same will move towards each other when the frames are swung out of alinement providing that the clamping bolts 3 are tightly clamped and the bolts 8 and 11 loose. Thus the teeth are prevented from assuming positions detrimental to proper cultivation. For instance, when the frames are in the forward dotted line position the soil will be directed outwardly, and the supplemental tooth will cultivate the soil between the inner ends of the frames 5. Of course if the bolts 3 are tight and the bolts 8 and 11 loose the bars 6 and 7 of the frames will approach each other when swung in one direction and move away from each other when swung in another direction. The dotted line position shown in the drawing merely illustrate the positions of the bars when the bolts 3 are loose and the bolts 8 and 11 tight.

It is to be understood that the present showing and description disclose only one specific embodiment of my present invention, and that other forms and modifications are included within the spirit and scope thereof, as expressed in the appended claim.

What is claimed is:—

A cultivator of the class described comprising a head; plates pivotally connected with said head; means for regulating the position of said plates in relation to said head; frames pivotally connected to said plates and means for regulating the position of said frames in relation to said plates.

In testimony whereof I have hereunto set my hand in presence of two subscribing witnesses.

JOHN B. SWAN.

Witnesses:
 SULLIVAN V. JOHNSON,
 EMIL SAMPSON.